US010456880B2

United States Patent
Furukawa et al.

(10) Patent No.: US 10,456,880 B2
(45) Date of Patent: Oct. 29, 2019

(54) PROCESSING MACHINE AND PROCESSING MACHINE LINE

(71) Applicant: FUJI CORPORATION, Chiryu (JP)

(72) Inventors: Kazuya Furukawa, Chiryu (JP);
Masahiko Mori, Toyota (JP);
Shigefumi Suzuyama, Toyota (JP)

(73) Assignee: FUJI CORPORATION, Chiryu (JP)

( * ) Notice: Subject to any disclaimer, the term of this patent is extended or adjusted under 35 U.S.C. 154(b) by 68 days.

(21) Appl. No.: 15/028,892

(22) PCT Filed: Oct. 28, 2013

(86) PCT No.: PCT/JP2013/079103
§ 371 (c)(1),
(2) Date: Apr. 12, 2016

(87) PCT Pub. No.: WO2015/063828
PCT Pub. Date: May 7, 2015

(65) Prior Publication Data
US 2016/0256968 A1    Sep. 8, 2016

(51) Int. Cl.
*B23Q 17/00* (2006.01)
*B23Q 37/00* (2006.01)
(Continued)

(52) U.S. Cl.
CPC .............. *B23Q 1/0045* (2013.01); *B23Q 7/14* (2013.01); *B23Q 37/007* (2013.01)

(58) Field of Classification Search
CPC ...... B23Q 1/0045; B23Q 37/007; B23Q 7/14; G05B 19/104
See application file for complete search history.

(56) References Cited

U.S. PATENT DOCUMENTS 5,359,530 A * 10/1994 Matsumura ........ G05B 19/4069
700/184
5,914,880 A *  6/1999 Yasojima ................ G06F 19/00
700/108
(Continued)

FOREIGN PATENT DOCUMENTS

JP          62068253 A  *  3/1987  ........... B23Q 1/0009
JP          04-326463 A     11/1992
(Continued)

OTHER PUBLICATIONS

International Search Report dated Jan. 21, 2014 for PCT/JP2013/079103 filed on Oct. 28, 2013.

*Primary Examiner* — Sara Addisu
(74) *Attorney, Agent, or Firm* — Oblon, McClelland, Maier & Neustadt, L.L.P.

(57) ABSTRACT

There is provided a processing machine and a processing machine line for which it is easy for an operator to view a screen display, including an operation panel with a free vertical and horizontal posture of a display in which a longitudinal dimension and a lateral dimension are different, in which a first display aspect which displays one screen that is displayed on the display and a second display aspect which is disposed lined up with two screens are switched. Switch buttons are set in order to perform switching between the first display aspect screen and the second display aspect screen, and the first display aspect screen and the second display aspect screen are mutually switched by operating the switching button, and during the switching, are rotated 90° with respect to the display.

9 Claims, 11 Drawing Sheets

(51) Int. Cl.
    *G06F 3/048*   (2013.01)
    *B23Q 1/00*    (2006.01)
    *B23Q 7/14*    (2006.01)

(56) References Cited

U.S. PATENT DOCUMENTS

| | | | |
|---|---|---|---|
| 2002/0129681 A1* | 9/2002 | Ono | G05B 19/404 |
| | | | 82/1.11 |
| 2006/0025920 A1 | 2/2006 | Nezu et al. | |
| 2008/0178537 A1* | 7/2008 | Spangler | B23P 21/00 |
| | | | 52/36.1 |
| 2010/0211901 A1 | 8/2010 | Nezu et al. | |
| 2010/0228436 A1 | 9/2010 | Nezu et al. | |
| 2013/0218322 A1* | 8/2013 | Carli | B23Q 17/2414 |
| | | | 700/180 |
| 2015/0019002 A1* | 1/2015 | Asahara | B23Q 11/0089 |
| | | | 700/185 |
| 2016/0023314 A1* | 1/2016 | Kobayashi | B23B 13/126 |
| | | | 82/164 |
| 2016/0214227 A1* | 7/2016 | Nagato | B23Q 39/04 |
| 2016/0236308 A1* | 8/2016 | Suzuyama | B23Q 37/007 |
| 2016/0256968 A1* | 9/2016 | Furukawa | B23Q 37/007 |
| 2016/0370905 A1* | 12/2016 | Chiba | G06F 3/04886 |
| 2017/0193796 A1* | 7/2017 | Sekikawa | G08B 21/20 |

FOREIGN PATENT DOCUMENTS

| | | | | |
|---|---|---|---|---|
| JP | 2000-218496 A | | 8/2000 | |
| JP | 2005-098831 A | | 4/2005 | |
| JP | 2008-158975 A | | 7/2008 | |
| JP | 2011-255472 A | | 12/2011 | |
| JP | 2012-000701 A | | 1/2012 | |
| JP | 2017004454 A | * | 1/2017 | G06F 3/04886 |

\* cited by examiner

PROCESSING MACHINE AND PROCESSING MACHINE LINE

TECHNICAL FIELD

The present disclosure relates to a processing machine and a processing machine line in which, in both a case where one screen is displayed on a display of an operation panel, and a case in which two screens are displayed, it is easy for the operator to view a screen display.

BACKGROUND ART

For example, in the machine tool such as an NC lathe, a machine operation check is performed by an operator according to a sequence program. At that time, a ladder diagram screen is displayed on the operation panel of the machine tool, and ON/OFF switching of a contact point is performed. Meanwhile, since confirmation of an output state that occurs due to switching in this manner is necessary, the operator performs confirmation by switching the display of the operation panel to an I/O monitor screen.

CITATION LIST

Patent Literature

PTL 1: JP-A-2000-218496
PTL 2: JP-A-2011-255472

SUMMARY

Problem to be Solved

In this manner, in a processing machine which is provided with an operation panel, an operator displays switching of a plurality of screens, and the operation advances while confirming each display screen. However, when it is necessary to switch the screen which is displayed on the operation panel every time of confirmation, it is necessary to frequently switch the operation panel screen display, work efficiency is bad, and the operator cannot view a plurality of screens at once, which is inconvenient. In this point, as a display technique, there is a multi-display function in which a plurality of screens are displayed so as to overlap, a split display function in which the screen is a split into two screens, and the like. However, the multi-display function cannot be said to be effective since a below overlapped screen cannot be viewed by the operator. In addition, with the split display function in which the screen is split into two, an aspect ratio changes since the screen is reduced without change, and the displayed screen is difficult for the operator to view.

Therefore, in order to solve the problem, the present disclosure has an object of providing a processing machine and a processing machine line in which, even when performing switching between one screen and two screens, it is easy for the operator to view a screen display.

Means for Solving the Problem

According to an aspect of the present disclosure, there is provided a processing machine including an operation panel with a free vertical and horizontal posture of a display in which a longitudinal dimension and a lateral dimension are different, in which a first display aspect which displays one screen that is displayed on the display and a second display aspect which is disposed lined up with two screens are switched, switch buttons are set in order to perform switching between the first display aspect screen and the second display aspect screen, and the first display aspect screen and the second display aspect screen are mutually switched by operating the switching button, and during the switching, are rotated 90° with respect to the display.

According to another aspect of the present disclosure, there is provided a processing machine line including a plurality of processing machine bodies which are connected to each other via a line concentrator, and an operation panel with a free vertical and horizontal posture of a display in which a longitudinal dimension and a lateral dimension are different, in which in the operation panel, predetermined information which relates to one processing machine body is displayed on the display by selecting the one processing machine body out of the plurality of processing machine bodies, a display in which a longitudinal dimension and a lateral dimension are different is provided, a first display aspect which displays one screen which is displayed on the display and a second display aspect which is disposed lined up with the two screens are switched, switch buttons are set in order to perform switching between the first display aspect screen and the second display aspect screen, and the first display aspect screen and the second display aspect screen are mutually switched by operating the switching button, and during the switching are rotated 90° with respect to the display.

Effects

According to the present disclosure, for example, a display of an operation panel is switched from one screen display to two screen display, and the screens are rotated 90° with respect to the display by an operator operating a switching button on a first display aspect screen display. For this reason, a horizontally longer screen is displayed along a vertical direction with respect to a display of a vertically longer posture when switched to two screens. Accordingly, since a screen which is displayed to be horizontally longer with respect to the display in a horizontally longer posture in the case of one screen is displayed so as to be horizontally longer without change also in the case of two screens, an aspect ratio of the screen is not largely changed, and it is easy for the operator to view a screen display.

DESCRIPTION OF EMBODIMENTS

Figure 1:
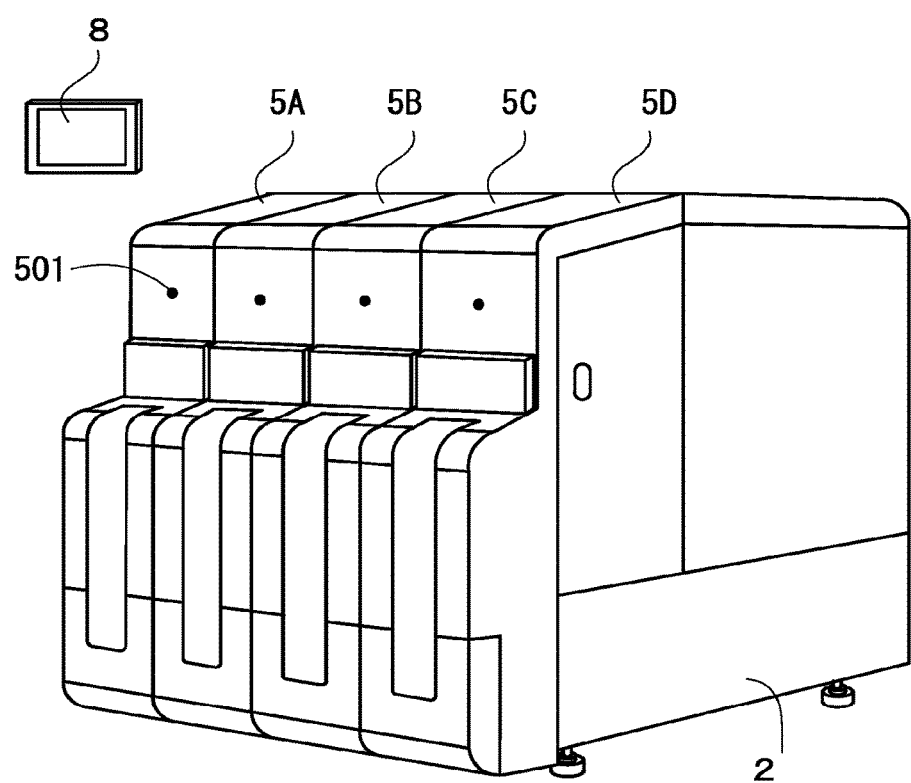
FIG. 1 is a perspective view illustrating one embodiment of a processing machine line.

Next, a processing machine and a processing machine line according to an embodiment of the present disclosure will be described below with reference to the drawings. FIG. 1 is a perspective view illustrating the processing machine line of the present embodiment. In a processing machine line 1, four machine tools 5 (5A, 5B, 5C, and 5D) are mounted on a base 2. Here, the machine tools 5 is an aspect of a processing machine body which is set forth in the claims.

The four machine tools 5 are NC lathes all of the same shape, and the internal structure, and entire form and dimensions are the same. Then, as will be described later, control devices of each machine tool 5 are connected to each other using a line concentrator. In addition, an auto loader, which is not shown in the drawings, that conveys a workpiece with respect to each machine tool 5 is provided on the processing machine line 1.

Here, "processing machine line" refers to a processing machine, group in which a plurality of machine tools that have a constant relationship are disposed. As illustrated, the processing machine line 1 of the present embodiment is disposed in a state in which the four machine tools 5 are substantially in contact in a width direction. However, in the processing machine line, the processing machines may be disposed to be separated from each other.

Figure 2:
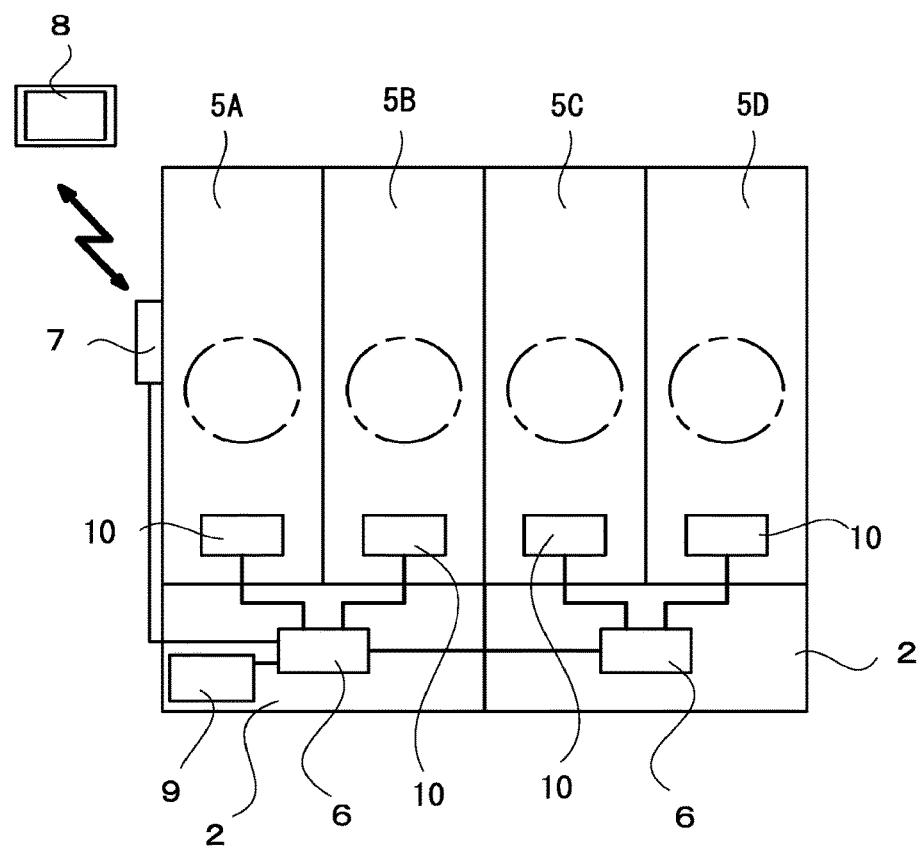
FIG. 2 is a diagram illustrating a relationship between machine tools in the processing machine line.
Figure 3:
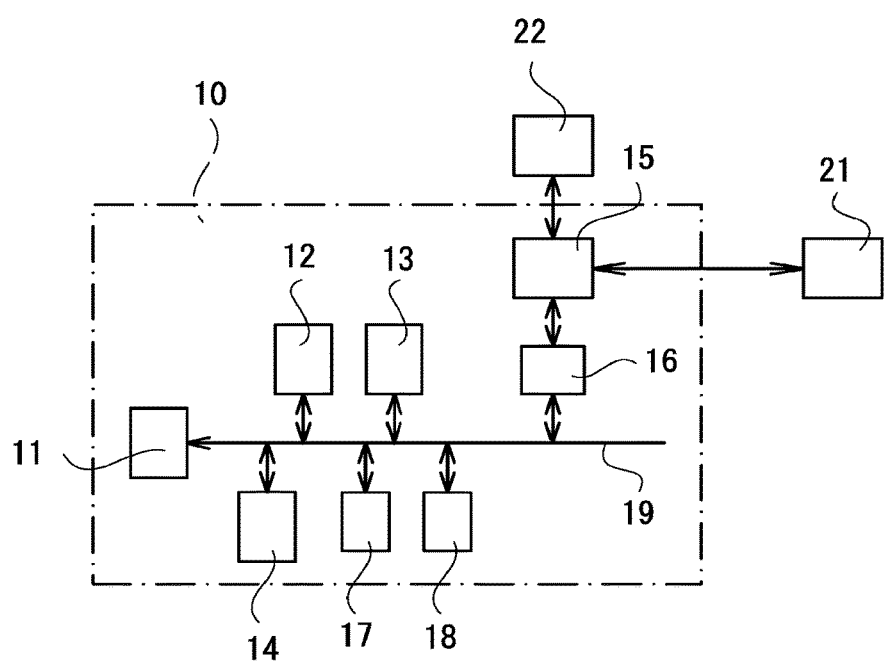
FIG. 3 is a block diagram illustrating a configuration of a control device which is provided on the machine tool.

Next, FIG. 2 is a diagram illustrating a relationship between machine tools in the processing machine line 1. In the processing machine line 1, two machine tools 5 are mounted with respect to one base 2, and the processing machine line 1 has a total of four machine tools 5. A hub 6 which is a line concentrator is provided in each base 2, respective control devices 10 of two machine tools 5 (5A and 5B, 5C and 5D) are connected. Furthermore, each hub 6 which is provided on each base 2 is also connected, and a local area network (LAN) is constructed. A wireless communication device 7 which is provided on the processing machine line 1 is connected to one hub 6, the four machine tools 5 are configured so as to be able communicate with the operation panel 8 via the wireless communication device 7.

In addition, in the processing machine line 1, the auto loader which is a workpiece automatic conveyance device is assembled, and a conveyance control device 9 which is drive control means for the auto loader is provided. The conveyance control device 9 is connected to the hub 6. For this reason, the auto loader is also configured so as to be able communicate with the operation panel 8 via the wireless communication device 7.

Next, FIG. 2 is a block diagram illustrating a configuration of the control device 10 which is provided on the machine tool 5. In the control device 10, a microprocessor (CPU) 11, a ROM 12, a RAM 13, a non-volatile memory 14, an I/O unit 15, and the like are connected via a bus line 19. The CPU 11 integratedly controls all of the control sections, a system program, a control parameter, or the like which are executed by the CPU 11 are stored in the ROM 12, and calculation data and the like are temporarily stored in the RAM 13. In addition, the volatile memory 14 stores predetermined information such as a sequence program of the machine tool 5 which is information that is necessary to a process which is performed by the CPU 11.

Then, a programmable machine controller (PMC) 16 which is connected to the I/O unit 15 is provided, on the control device 10, and a processing driving section of the machine tool 5 is controlled by the sequence program which is formed in a ladder format. Each function command of an M function, an S function, and a T function according to a processing program is converted to a signal which is necessary according to the sequence program, and an output is performed to a machine tool driving section 21 from the I/O unit 15. The machine tool driving section 21 has a head stock, a Z-axis drive device, an X-axis drive device, or the like which are major structures of the machine tool 5, the I/O unit 15 is connected to an auto loader 22 other than such a machine tool driving section 21, and input and output of a control signal for controlling each driving section are performed.

The auto loader 22 is provided with a loader driving section for driving a loader that grips and conveys the workpiece, an automatic door diving section for opening and closing an automatic door which is provided on the machine tool 5, and a jig driving section for operating a jig on which the workpiece is fixed. Then, a LAN interface 17 is connected to the bus line 19, and is able to wirelessly communicate with the operation panel 8 via the wireless communication device 7 from the hub 6. In addition, an external interface 18 for connecting to an external personal computer or the like is also provided.

In the present embodiment, four machine tools 5 are configured so as to be able to be operated using one operation panel 8. The operation panel 8 is used as an operation panel of the machine tool 5, and is provided with a display that is display means for performing screen display and input means as well on which an input device is integral and a touch operation is effective, and an antenna for wireless communication. Note that one operation panel 8 may be provided with respect to a plurality of processing machines in the manner of the present embodiment, but one operation panel 8 may be provided with respect to one processing machine.

The processing machine line 1 of the present embodiment is configured such that it is possible to mount the operation panel 8 with respect to each machine tool 5. In each machine tool 5, an attachment tool 501 is formed on a front surface portion, an attachable and detachable section which is not shown in the drawings is formed on a back surface side of the operation panel 8, and it is possible to attach and detach the operation panel 8 with respect to the machine tool 5. Accordingly, in the manner of the present embodiment, there is a case of one operation panel 8 with respect to the processing machine line 1, or a dedicated operation panel 8 may be attached to all four machine, tools 5. In addition, an attachment structure which is formed of the attachment tool 501 is a mechanism which is able to rotate the attached operation panel 8. Consequently, the operation panel 8 of a rectangular form is attached by setting a horizontally longer state as a reference posture, but it is also possible to set a vertically longer posture by rotating the operation panel 8 of a rectangular form by 90°.

Figure 4:
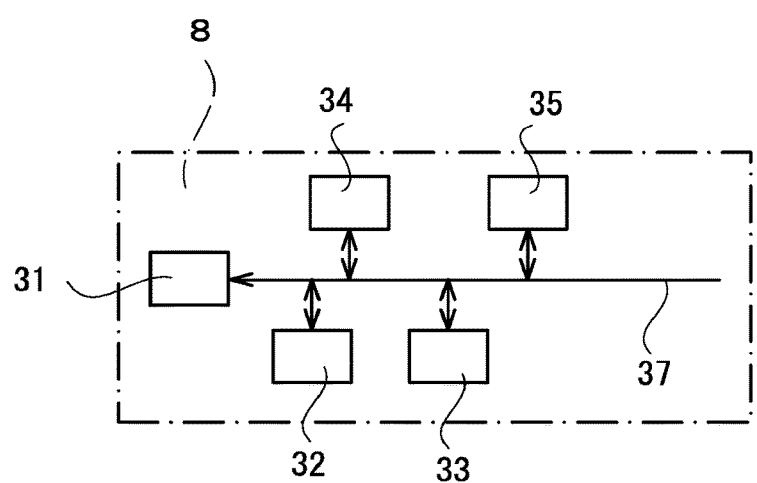
FIG. 4 is a block diagram illustrating a control section of an operation panel.

FIG. 4 is a block diagram illustrating a control section of the operation panel 8. The operation panel 8 is configured by a CPU 31 which is a center of the control section, a RAM 32 or a nonvolatile memory 33 which is a memory section, a touch panel 34 which is a display section and an input section, a wireless communication section 35 which performs wireless communication with the machine tool 5, and the like. The CPU 31 is connected to each section via a bus line 37, and carries out the overall control of the operation panel 8. The RAM 32 temporarily stores various data which is generated during execution of various programs using the CPU 31. The non-volatile memory 33 stores information which is necessary in a process which is performed by the CPU 31, and a display control program or the like for executing screen display by the operation panel 8 which will be described later is stored.

In the touch panel 34, the input device is integral to the display device (display). In detail, a capacitive type or resistive type or the like is used, and it is specified what display element is designated by a detecting the position at which the finger touches using a sensor. The operation panel 8 may be provided with an operation button or the like as an input section other than a touch panel. Then, the wireless communication section 35 performs transmission and reception of a signal with the wireless communication device 7 of the machine tool 5, for example, wireless LAN or Bluetooth (registered trademark) is used. A millimeter wave or the like may also be used.

Figure 5:
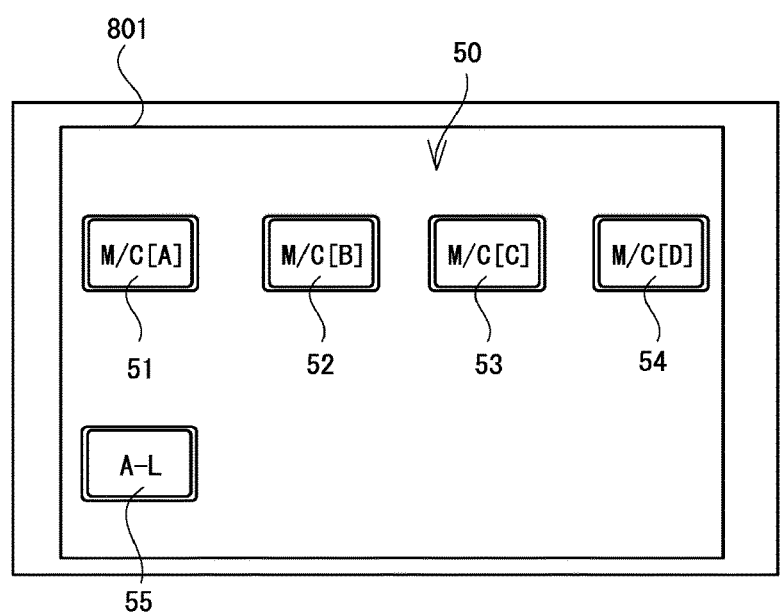
FIG. 5 is a diagram illustrating a processing machine selection screen which is displayed on the operation panel.

Next, FIG. 5 is a diagram illustrating a processing machine selection screen which is displayed on the operation panel 8. The processing machine selection screen 50 is displayed as an initial screen on a display 801 of the operation panel 8. The selection button for selecting the processing machine which it is possible to communicate with is set on the screen. In the present embodiment, since the four machine tools 5A, 5B, 5C, and 5D, and the auto loader 22 correspond, five selection buttons 51, 52, 53, 54, and 55 are disposed on the processing machine selection screen 50. Then, transmission and reception of the signal is performed wirelessly with the corresponding machine tool 5 and the like by the operator touching one selection button.

The information from the operation panel 8 accompanying selection has a unique address information which corresponds to the machine tools 5A, 5B, 5C, and 5D and the auto loader 22. For this reason, an operation signal is sent from the operation panel 8 with respect to, for example, the selected machine tool 5 and the like, and the predetermined information is sent from the machine tool 5 and the like and displayed on the operation panel 8 by communication via the wireless communication section 35 of the operation panel 8 and the wireless communication device 7 of the processing machine line 1.

Figure 6:
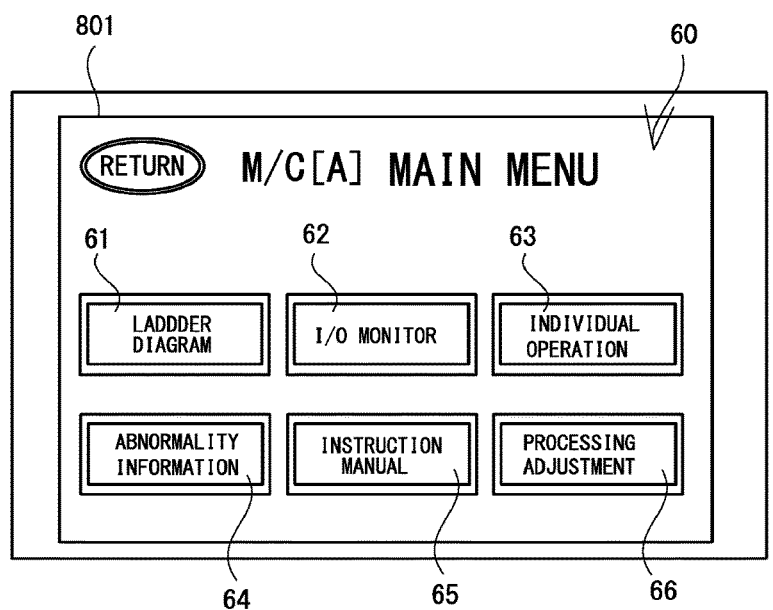
FIG. 6 is a diagram illustrating a main menu screen which corresponds to one machine tool.

Here, the selection button 51 is pressed from the processing machine selection screen 50 and the machine tool 5A is selected. The main menu screen of the machine tool 5A which is illustrated in FIG. 6 is displayed on the display 801 of the operation panel 8. A selection button for selecting predetermined information and the like which relates to the machine tool 5 is disposed on the main menu screen 60. The predetermined information which relates to the machine tool 5 is the ladder diagram, each individual piece of operation information, I/O monitor information, abnormality information, an instruction manual, or the like. In order to select such predetermined information, each selection button of a ladder diagram button 61, an I/O monitor button 62, each individual operation button 63, an abnormality information button 64, an instruction manual button 65, and a processing adjustment button 66 are set on the main menu screen 60.

Here, in an NC machine tool such as a machining center, an operation check of the machine tool is performed while the operator views a sequence of a screen that is displayed on a display 801. The same applies to the machine tool 5 of the present embodiment. As sequence display, the ladder diagram is used which expresses the sequence program using a coil and contact of the relay. In the operation check, the operator displays the predetermined information such as a ladder diagram of the corresponding machine tool 5 with respect to the display 801 of the operation panel 8, while performing confirmation of the screen.

During the operation check, other than the ladder diagram, each individual piece of operation information, an I/O monitor, and the like are utilized. For this reason, the operator displays a ladder diagram screen, and an I/O monitor screen on the display 801. In detail, the operator performs driving of the machine tool 5 by operating an operation switch manually while confirming the ladder diagram screen. Then, the I/O monitor screen is displayed on the display 801, and the operator confirms in what manner the ON/OFF state of the signal is in each operation from the I/O monitor screen.

Figure 7:
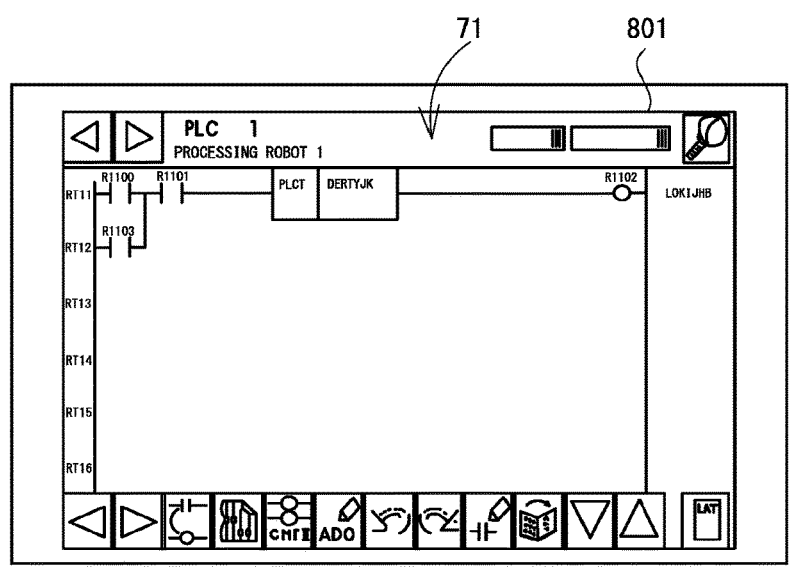
FIG. 7 is a diagram illustrating one screen display which is a standard state of a display.
Figure 8:
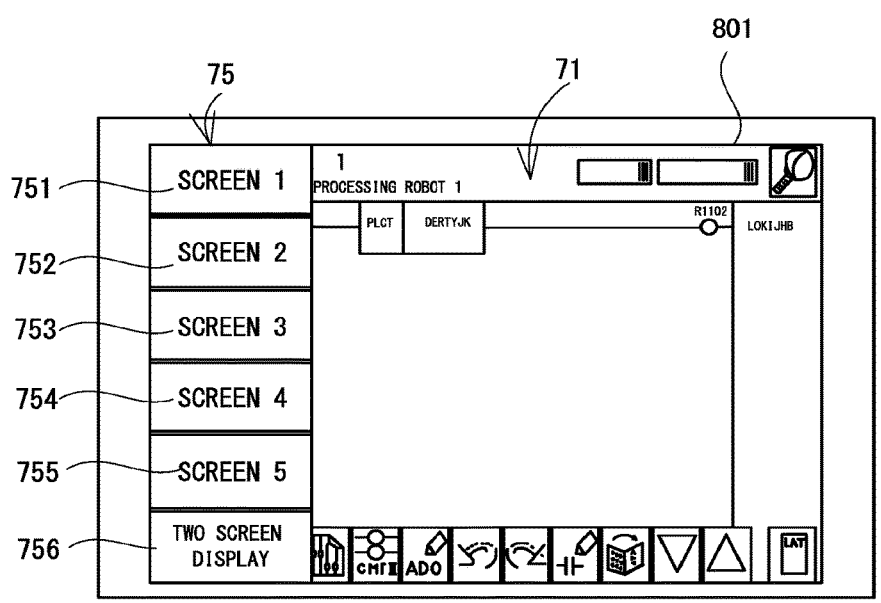
FIG. 8 is a diagram illustrating a menu switching state using one screen.
Figure 9:
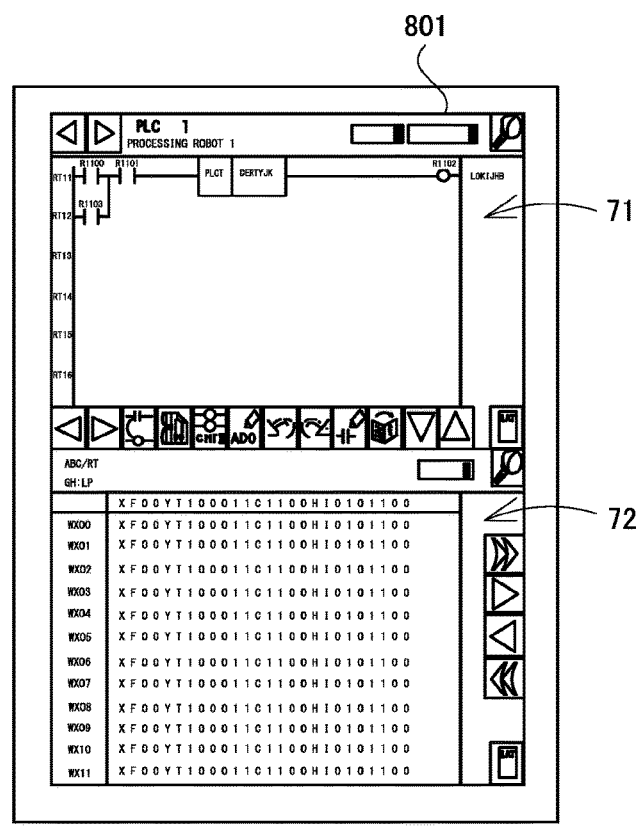
FIG. 9 is a diagram illustrating a case of switching to two screen display.
Figure 10:
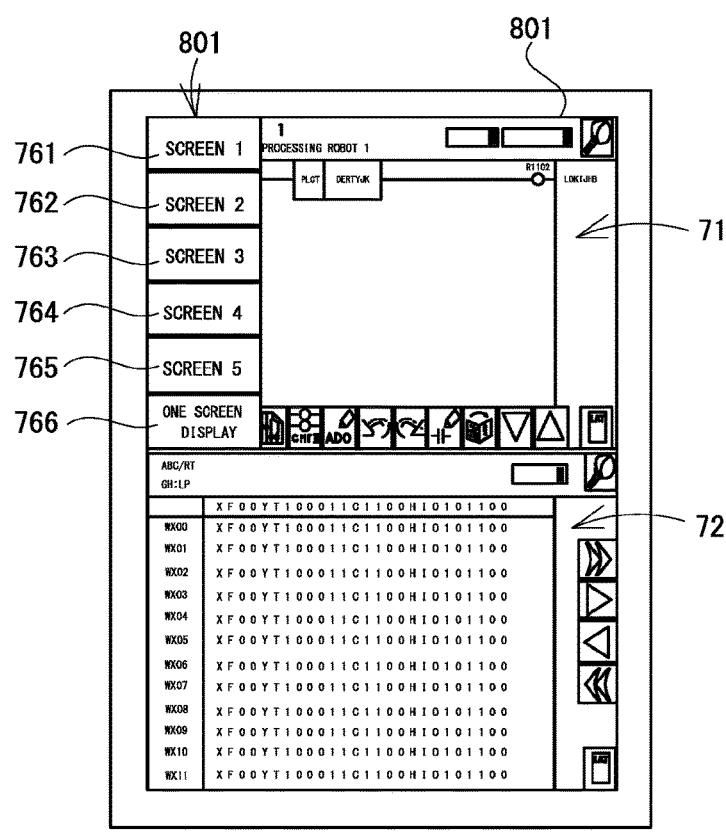
FIG. 10 is a diagram illustrating a menu switching state using two screens.
Figure 11:
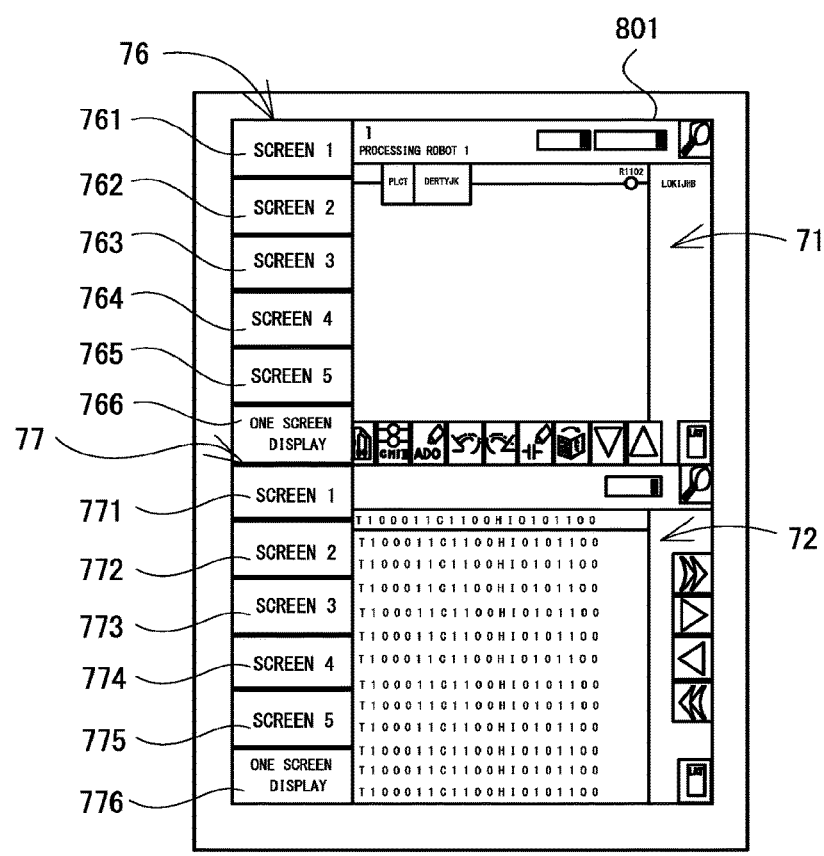
FIG. 11 is a diagram illustrating a menu switching state using two screens.

In a case where the operation check and the like is performed on the machine tool 5, the operator has to confirm a plurality of pieces of information, and it is inconvenient to switch the screen of the operation panel 8 and to display the corresponding information each time. For this reason, in a case were information confirmation is necessary using two screens, the screen of the operation panel 8 is switched by the operator. Here, FIGS. 7 to 11 are diagrams illustrating screens which are displayed on the display 801 of the operation panel 8. FIG. 7 is a diagram illustrating one screen display which is standard, and FIG. 8 is a diagram illustrating a menu switching state on one screen. FIG. 9 is a diagram illustrating a case of switching to two screen display, and FIGS. 10 and 11 are diagrams illustrating a menu switching state on two screens. Here, the screens which are displayed in FIGS. 7 and 8 are ladder diagram screens, and the screens which are displayed in FIGS. 9 to 11 are ladder diagram screens and I/O monitor screens.

In a case where switching of the screen is performed by the operator selecting the machine tool 5A, first, the main menu screen of the machine tool 5A which is illustrated in FIG. 6 is displayed on the display 801 by pressing the selection button 51 from the processing machine selection screen 50 which is illustrated in FIG. 5. Then, the screen switches to a ladder diagram screen 71 which is illustrated in FIG. 7 by the operator pressing the ladder diagram button 61. At this time, the operation panel 8 is in a state of a horizontally longer reference posture, and the ladder diagram screen 71 such as illustrated in FIG. 7 is displayed on a horizontally longer display 801. The display screen which relates to the predetermined information of the machine tool 5A is not only the ladder diagram screen 71, but may also be an I/O monitor screen, each individual operation screen, an abnormality information screen, an instruction manual screen, a processing adjustment screen, and the like, and horizontally longer display is a standard for all.

Next, when a fingertip which touches the left end of the display 801 is slid to the right, as shown in FIG. 8, a menu bar 75 appears. Selection buttons 751 to 755 for displaying other screens (screens 1 to 5) than the ladder diagram screen 71 and a two screen switching button 756 are set on the menu bar 75. When one of the selection buttons 751 to 755 is pressed, display of the display 801 is switched from the ladder diagram screen 71 to a corresponding information screen such as the I/O monitor screen.

Meanwhile, when the two screen switching button 756 is pressed, as shown in FIG. 9, display of the display 801 is switched to two screens. At that time, in a case where the screen is rotated 90° and the display 801 is set to a vertically longer posture, the two screens are disposed one above the other. In FIG. 9, display of the display 801 is split into two, the ladder diagram screen 71 and the I/O monitor screen 72 are displayed one above the other. In a case where the two screen switching button 756 is selected, for example, a screen which is displayed during selection and a past screen which is displayed immediately before are displayed. Then, the screen which is displayed during selection is disposed on an upper side, and the past screen is disposed on a lower side.

In a case where, concerning the respective two screens, the screens are to be modified, in the same manner as the case of one screen, each screen up and down is able to be switched. For example, in a case where the ladder diagram screen 71 on the upper side is to be modified, the fingertip which touches the left end of the display 801 that is a portion on which the ladder diagram screen 71 is displayed, and is in the vertically longer posture, is slid to the right. As shown in FIG. 10, by doing this, a menu bar 76 appears on the display 801. Selection buttons 761 to 765 for displaying other screens than the ladder diagram screen 71 and a one screen switching button 766 are set on the menu bar 76. Therefore, when one of the selection buttons 761 to 765 are pressed, the screen on the upper side is switched to another information screen from the ladder diagram screen 71.

Then, in the same manner as the case in which the I/O monitor screen 72 on the lower side is to be modified, the fingertip which touches the left end of the display 801 that is a portion on which the I/O monitor screen 72 is displayed, and is in the vertically longer posture, is slid to the right. As shown in FIG. 11, by doing this, a menu bar 77 appears on the display 801. Selection buttons 771 to 775 for displaying other screens than the I/O monitor screen 72 and a one screen switching button 776 are set on the menu bar 77. Therefore, when one of the selection buttons 771 to 775 is pressed, display on the lower side is switched from the I/O monitor screen 72 to another information screen.

Meanwhile, on one of the menu bars 76 and 77 which appear on the screen up and down, when the one screen switching button 766 or 776 is pressed, as shown in FIG. 7, display of the display 801 is switched to one screen. At that time, the screen is rotated 90° and a horizontally longer screen is displayed on the display 801 with a horizontally longer posture. At this time, if the one screen switching button 766 of the menu bar 76 is pressed, the ladder diagram screen 71 is displayed on the display 801, and if the one screen switching button 776 of the menu bar 77 is pressed, the I/O monitor screen 72 is displayed on the display 801.

In addition, in a case where the operator confirms the predetermined information and the like of the other machine tools 5B, 5C, and 5D or the auto loader 22, the screen returns to the processing machine selection screen 50 which is indicated in FIG. 5, and the corresponding button is pressed from selection buttons 52, 53, 54, and 55. Then, in a similar manner to the case of the machine tool 5A described above, and the operation of the operation panel 8 is performed. Here, in the present embodiment, it is possible to display the predetermined information of a plurality of processing machines in one operation panel 8. For this reason, it is conceivable that the operator forgets the machine tool 5 of which the predetermined information is displayed. Therefore, it is preferable to set such that it is possible to confirm which target machine tool is displayed on the display 801.

For example, each machine tool 5 and the auto loader 22 are divided into each color and the like, and some identification mark is displayed on the screen. In the case of color division, the respective color of each machine tool 5 or the auto loader 22 is determined, and a background and the like is color divided. For example, the machine tool 5A is set as "red," the machine tool 5B is set as "blue," the machine tool 5C is set as "yellow," the machine, tool 59 is set as "green," and the auto loader 22 is set as "pink." Consequently, the selection buttons 51 to 55 that are indicated in FIG. 5 are displayed with the corresponding colors, and on the screen which is indicated in FIGS. 6 to 11, the background becomes the corresponding color. Thereby, the operator is able to simply determine the processing machine to which the predetermined information and the like that is displayed relates to.

Consequently, in the present embodiment as above, the operation panel 8 which displays the predetermined information of the machine tool 5 is switchable between one screen and two screens, and during the switching, the screen is rotated 90°. For this reason, either if there is one screen or if there are two screens, the screen of the predetermined information or the like which relates to the machine tool 5 is displayed so as to be horizontally longer, the posture of the operation panel 8 may be rotated 90° in accordance with the number of screens, and it is easy for the operator to view a screen display.

In addition, in the present embodiment, rotation of the screen which is performed on the display 801 is displayed only when the number of screens is switched according to the operation of switching buttons 756, 766, and 776. That is, since there is no automatic rotation due Lo posture change of the operation panel 8, from a point that a state in which the display is easy to view by the operator is maintained, it is easy to handle.

In addition, in the present embodiment, since the control device 10 of the machine tool 5 or the conveyance control device of the auto loader 22 is connected to the wireless communication device 7 via the hub 6, it is possible to communicate with four machine tools 5 and the auto loader 22 using one operation panel 8. Consequently, since the plurality of processing machines are able to be operated by the operation panel 8 in one location, it is possible to reduce a load on the operator or the number of people. Then, it is also possible to operate the operation panel 8 at an arbitrary location for wireless communication.

An embodiment of the present disclosure is described above, but the present disclosure is not limited, thereto, and various modifications are possible within a range which does not depart from the gist of the present disclosure.

In the embodiment, communication between the operation panel 8 and the machine tool 5 is wireless, and the operation panel 8 is described as being attachable and detachable with respect to the machine tool 5, but if the operation panel 8 is rotatable with respect to the machine tool 5, the operation panel 8 may not able to be removed and may be connected with respect to the control device 10 using a communication cable.

In addition, in the embodiment, an example is given of the processing machine line 1 which is formed of the plurality of machine tools 5, but the processing machine is not necessarily limited to machine tool, or there may be one processing machine which is provided with the operation panel, not a plurality.

In addition, the embodiment describes a case in which the predetermined information screen of the machine tool 5A which is vertically longer is displayed as a standard, but the predetermined information screen of the processing machine may be displayed with the vertical as a standard.

REFERENCE SIGNS LIST

1: processing machine line, 5 (5a, 5b, 5c, 5d): machine tool, 6: hub, 7: wireless communication device, 8: operation panel, 10: control device, 35: wireless communication section, 801: display

The invention claimed is:

1. A processing machine comprising:
an operation panel including a rectangular display in which a longitudinal dimension of the display is longer than a lateral dimension of the display,
wherein the operation panel is switchable between a first display state in which only a first screen is displayed on the display and a second display state in which the first screen and a second screen are displayed on the display, a first type of predetermined information related to a machine tool of the first screen and a second type of predetermined information related to the machine tool of the second screen being different from each other,
wherein a switch button is set in order to perform switching between the first display state in which only the first screen is displayed on the display and the second display state in which the first screen and the second screen are displayed on the display,
wherein the operation panel has a first display position in which the longitudinal dimension of the display is horizontal and the lateral dimension is vertical, and a second display position in which the lateral dimension is horizontal and the longitudinal dimension is vertical,
wherein the operation panel is switched between the first display state and the second display state by operating the switch button such that in the first display state, the operation panel is in the first display position, and the in second display state, the operation panel is in the second display position which is rotated 90° with respect to the first display position, and
wherein, in the second display state, the first and second screens are lined up one on top of the other.

2. The processing machine according to claim 1, wherein the operation panel is able to wirelessly communicate with a machine tool using a wireless communication device.

3. The processing machine according to claim 1, wherein the switch button is provided on a left side of the display in the first display state and in the second display state.

4. The processing machine according to claim 1, wherein the first screen is a ladder diagram screen and the second screen is an I/O monitor screen.

5. A processing machine line comprising:
a plurality of processing machine tools which are connected to each other via a line concentrator; and
an operation panel including a rectangular display in which a longitudinal dimension of the display is longer than a lateral dimension of the display,
wherein in the operation panel, predetermined information which relates to one processing machine body is displayed on the display by selecting the one processing machine tool out of the plurality of processing machine tools,
wherein the operation panel is switchable between a first display state in which only a first screen is displayed on the display and a second display state in which the first screen and a second screen are displayed on the display, a first type of predetermined information related to one of the plurality of processing machine tools a machine tool of the first screen and a second type of predetermined information related to the one of the plurality of processing machine tools of the second screen being different from each other,
wherein a switch button is set in order to perform switching between the first display state in which only the first screen is displayed on the display and the second display state in which the first screen and the second screen are displayed on the display,
wherein the operation panel has a first display position in which the longitudinal dimension of the display is horizontal and the lateral dimension is vertical, and a second display position in which the lateral dimension is horizontal and the longitudinal dimension is vertical,
wherein the operation panel is switched between the first display state and the second display state by operating the switch button such that in the first display state, the operation panel is in the first display position, and in the second display state, the operation panel is in the second display position which is rotated 90° with respect to the first display position, and
wherein, in the second display state, the first and second screens are lined up one on top of the other.

6. The processing machine line according to claim 5, wherein the operation panel is able to wirelessly communicate with the plurality of processing machine tools using a wireless communication device.

7. The processing machine line according to claim 5, wherein the predetermined information of the plurality of processing machine bodies are respectively displayed by indication of different colors on the display.

8. The processing machine line according to claim 5, wherein the switch button is provided on a left side of the display in the first display state and in the second display state.

9. The processing machine line according to claim 5, wherein the first screen is a ladder diagram screen and the second screen is an I/O monitor screen.

* * * * *